(12) United States Patent
Kleeberg et al.

(10) Patent No.: US 7,237,357 B2
(45) Date of Patent: Jul. 3, 2007

(54) PLANT POT

(75) Inventors: Karsten Kleeberg, Bad Doberan (DE); Horst Meissner, Pinneberg (DE)

(73) Assignee: Von Bismark GmbH (DE)

( * ) Notice: Subject to any disclaimer, the term of this patent is extended or adjusted under 35 U.S.C. 154(b) by 0 days.

(21) Appl. No.: 10/474,607

(22) PCT Filed: Apr. 10, 2002

(86) PCT No.: PCT/EP02/04011

§ 371 (c)(1),
(2), (4) Date: Oct. 10, 2003

(87) PCT Pub. No.: WO02/082884

PCT Pub. Date: Oct. 24, 2002

(65) Prior Publication Data

US 2004/0103582 A1   Jun. 3, 2004

(30) Foreign Application Priority Data

Apr. 12, 2001   (DE) ............................. 101 18 709

(51) Int. Cl.
*A01G 31/02* (2006.01)
*A01G 9/02* (2006.01)

(52) U.S. Cl. .......................................... 47/62 A; 47/79
(58) Field of Classification Search .............. 47/18, 47/19.1, 19.2, 65.5, 66.1, 79, 80
See application file for complete search history.

(56) References Cited

U.S. PATENT DOCUMENTS

| 3,451,162 | A | * | 6/1969 | Rasmussen | 47/62 E |
| 4,149,340 | A | * | 4/1979 | DaVitoria-Lobo | 47/79 |
| 4,745,707 | A | * | 5/1988 | Newby | 47/79 |
| 5,225,342 | A | * | 7/1993 | Farrell | 435/430 |
| 6,035,578 | A | * | 3/2000 | Lo et al. | 47/61 |
| 6,332,287 | B1 | | 12/2001 | Geraldson | 47/79 |

FOREIGN PATENT DOCUMENTS

| DE | 3446677 A1 | * | 10/1986 |
| DE | 6 91 12 058.6 | | 11/1991 |
| DE | 19918418 C1 | | 10/2000 |
| EP | 0 846 413 A | | 6/1998 |
| FR | 2 556 929 A | | 6/1985 |
| GB | 396 564 A | | 8/1933 |
| JP | 406303846 A | * | 11/1994 |
| JP | 200093004 A | * | 4/2000 |

OTHER PUBLICATIONS

International Search Report, issued in PCT/EP02/04011 (corresponding international app. to 10/474,607), mailed Sep. 10, 2002 (3 pages)(Listing All References Submitted Herewith).

* cited by examiner

*Primary Examiner*—Son T. Nguyen
(74) *Attorney, Agent, or Firm*—Lerner, David, Littenberg, Krumholz & Mentlik, LLP

(57) ABSTRACT

The invention entails a plant container having a grid pot with a carrier insert and a cover jacket detachably connected to the carrier insert.

21 Claims, 1 Drawing Sheet

PLANT POT

FIELD OF THE INVENTION

The invention relates to plant containers.

BACKGROUND OF THE INVENTION

A successful culture of room plants is only possible if the plant is given optimal conditions when being supplied with water and oxygen. One of the main problems that can cause failures is a uniform supplying of water to the plants, that on the one hand must not dry out but on the other hand as a rule do not tolerate standing wetness. Standing poured-on water down to the root area causes a lack of oxygen in the roots, which has the consequence that they begin to rot and thus the entire plant sooner or later perishes. A sufficient oxygen supply for the roots is especially necessary for epiphytically growing plants, so that various suggestions have already been made for developing plant containers that on the one hand have a sufficient drainage and on the other hand have a sufficient supply of air. Thus, G 91 12 058 teaches a container for the individual planting of orchids that consists of a grid (or lattice or grating) pot arranged in another pot whose bottom is designed as a water reservoir with air circulation openings in its upper area.

However, the disadvantage of such previously known plant containers is that in the case of excessive watering, the bottom of the grid pot can make contact with the water in the reservoir and that, moreover, the circulation of air is possible only to a limited extent. Therefore, there is still a need for plant containers that on the one hand reliably drain off poured-on water and on the other hand make possible a stronger supply of oxygen to the roots.

SUMMARY OF THE INVENTION

In order to solve this problem plant containers are suggested that are characterized in that they consist of a grid (or lattice) pot, a carrier insert and a cover jacket detachably connected to the grid pot.

It surprisingly turned out that an unexpectedly good growth of plants can be achieved by the construction of a plant container consisting of a grid pot that receives the plant together with the plant substrate and is then placed into a carrier insert that functions at the same time as a water reservoir but has an overflow, and by a cover jacket connected to the grid pot.

DESCRIPTION OF THE PREFERRED EMBODIMENTS

Figure 1:
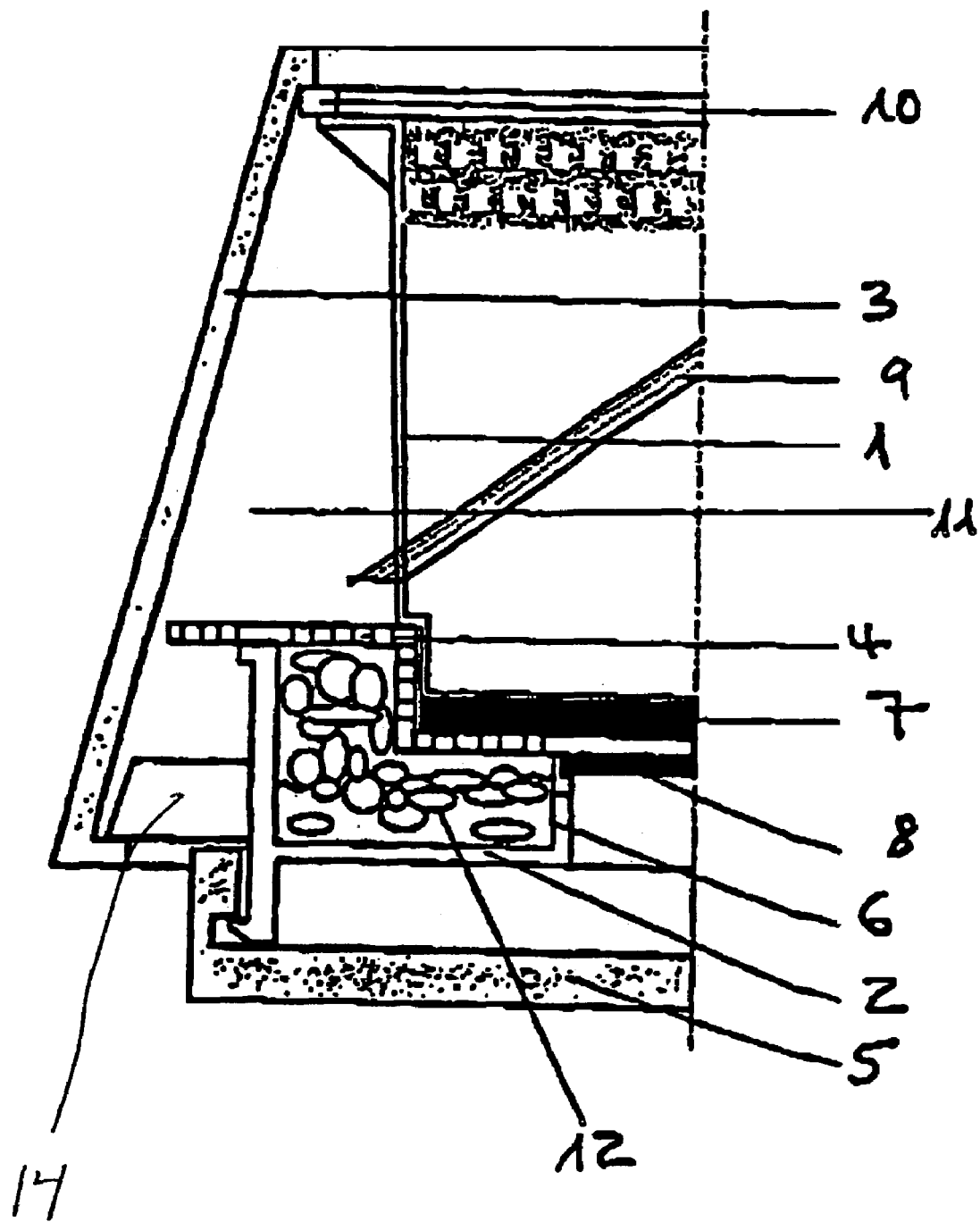
FIG. 1 shows a plant container in accordance with the invention and in longitudinal section.

The cover jacket connected to the grid pot has the shape of a truncated cone, that is, it tapers upward and widens out downward so that a circumferential air slot open at the bottom is formed between the grid pot and the jacket. This construction makes it possible that the air is drawn in chimney fashion through the system, during which the upward air movement guarantees a good circulation of air in the area of the roots. During pouring, the water not absorbed by the plant is stored in the carrier insert that has, however, an overflow that preferably runs into a water trap dish connected to the carrier insert so that an overfilling of the water reservoir is reliably prevented. A catch basket is preferably provided between the grid pot and the carrier insert in order to prevent parts of the substrate from being able to pass into the reservoir. In another preferred embodiment the bottom of the grid pot is covered with a filter in order to prevent or in any case to reduce the migration of undesired microorganisms by the absorption capacity of such a filter. Carbon filters but also filters based on diatomaceous earth or zeolites that reduce the growth of microorganisms by their high absorptive capacity can be used as filter.

The water reservoir of the carrier insert is preferably filled with coarse-grained particles such as, e.g., with grit, pebbles, crushed stone such as, e.g., basalt or tuff in order on the one hand to further the evaporation of running off poured-on water but on the other hand to also function as a long-time fertilizer reservoir, since coarse-grained particles of stone gradually give off, even though in small amounts, trace elements required by the plants. Instead of inorganic, coarse grain material, organic materials such as plastic chips or small plastic beads that can be impregnated or coated with trace elements if necessary can be used as filler for the reservoir.

It also proved to be advantageous if one or several magnets are placed at least at one location under the bottom of the catch basket since the placing of a magnetic field can positively influence the growth of plant roots.

In a further embodiment at least the lower part of the covering jacket or the bottom of the water trap dish is provided with possibilities for heating, which can achieve two effects, namely, on the one hand an intensification of the chimney effect by an elevated temperature of at least one part of the covering jacket or of the water trap dish. There is also the fact in the latter instance that the evaporation of any water standing in the dish is furthered as a result thereof and the atmospheric moisture is elevated in the area of the roots. An elevated atmospheric moisture in this area is extremely advantageous for the growth of the plants in contrast to a standing wetness in the case of excessive watering.

If the aeration of the substrate is to be furthered even more, the grid pot can be provided with at least one or several aeration tubes that communicate with the circumferential air slot so that the exchange of air and therewith of oxygen in the area of the roots can be clearly elevated in this manner.

It can also be provided, depending of the location of the plant, that illuminating bodies with plant-compatible light sources are attached above the mounting (or assembly) ring to which the grid pot and the cover jacket are connected if the location of the plant or the climate made additional illumination necessary. Suitable discharge tubes that emit more strongly in the range of blue light are commercially available.

During the mounting of the plant container the carrier insert is filled with one-part particles and then the cover basket is set on the carrier insert, during which the magnet can be attached, if necessary, to the bottom of the cover basket. Then the filter is introduced into the cover basket and the carrier insert is provided in this prepared form with the cover jacket, e.g., by holding straps or snap connections. Then the water trap dish is connected to the carrier insert. The grid pot with the plant is then placed into the system and a firm connection is then established between the grid pot and the cover jacket by a mounting ring that can be fastened, e.g., by snap connections or by adhesion.

In another embodiment of the invention suitable in particular for large plants and therefore for large plant containers the filter, the magnet and/or the water reservoir with the coarse-grained particles can also be designed as modules that permit an individual replacement in order to prevent the plant containers, that are very heavy after having received plants, from having to be lifted and moved. Such modules can be designed like drawers so that an exchange can take place after the removal of the cover jacket without the entire system having to be disassembled for renewal.

The invention is described in detail in the following with reference made to the figure.

FIG. 1 shows a plant container in accordance with the invention and in longitudinal section. Grid pot 1 is inserted into cover basket 4 and the bottom of the grid pot is provided with filter 7. Cover basket 4 is inserted into carrier insert 2 in such a manner that water running out of the grid pot is trapped in water reservoir 12 provided with coarse-grained particles 6. Furthermore, the carrier insert is provided with magnet 8 located underneath the bottom of grid pot 1. Water reservoir 12 communicates via an overflow with water trap dish 5, that for its part communicates with air slot 11 so that evaporating water can also move in it.

The connection between truncated-cone cover jacket 3 and the grid pot preferably takes place via mounting ring 10. The truncated-cone cover jacket 3 tapers upward and widens out downward so that air slot 11 forms an opening 14 at or near trap dish 5.

One or several air supply tubes 9 can be provided inside grid pot 1 for reinforcing the aeration.

The invention claimed is:

1. A plant container comprising:
   a trap dish;
   a carrier insert disposed in said trap dish;
   a cover basket inserted into said carrier insert;
   a grid pot inserted into said cover basket;
   a mounting ring attached to said grid pot;
   a conical cover jacket connected to said carrier insert by said trap dish and connected to said grid pot by said mounting ring; and
   a circumferential air slot formed between said grid pot and said cover jacket,
   wherein said conical cover jacket widens out downward from said mounting ring to said trap dish forming an opening at or near said trap dish, said opening allowing for air to be drawn into said circumferential air slot.

2. The plant container according to claim 1, wherein said carrier insert further comprises a water reservoir having an overflow portion.

3. The plant container according to claim 2, wherein said water reservoir includes coarse-grained particles.

4. The plant container according to claim 3, wherein said water reservoir is a module capable of being removed from said plant container.

5. The plant container according to claim 1, wherein at least a lower part of said cover jacket or a bottom portion of said trap dish are heated.

6. The plant container according to claim 1, further comprising a filter situated below said grid pot.

7. The plant container according to claim 1, further comprising a magnet situated below said cover basket.

8. The plant container according to claim 7, wherein said magnet is a module capable of being removed from said plant container.

9. The plant container according to claim 1, further comprising at least one aeration tube at least partially situated in said plant container.

10. The plant container according to claim 1, wherein the connection between said grid pot and said cover jacket and/or the connection between said carrier insert and said cover jacket are detachable.

11. The plant container according to claim 10, wherein the connection between said carrier insert and said water trap dish is detachable.

12. The plant container according to claim 11, wherein at least some of the connections are snap connections.

13. The plant container according to claim 1, wherein air is drawn into said circumferential air slot in a chimney fashion.

14. A plant container comprising:
    a trap dish;
    a carrier insert disposed in said trap dish;
    a cover basket inserted into said carrier insert;
    a grid pot, said grid pot being inserted into said cover basket;
    a conical cover jacket connected to said trap dish and connected to said grid pot; and
    a circumferential air slot formed between said grid pot and said cover jacket,
    wherein said conical cover jacket widens out downward from said grid pot to said trap dish forming an opening at or near said trap dish, said opening allowing for air to be drawn into said circumferential air slot.

15. The plant container of claim 14, further comprising a mounting ring attached to said grid pot, said conical cover jacket connected to said carrier insert by said trap dish and connected to said grid pot by said mounting ring.

16. The plant container of claim 14, further comprising a removable water reservoir having an overflow portion.

17. The plant container of claim 14, further comprising a magnet.

18. The plant container of claim 14, further comprising at least one aeration tube at least partially situated in said plant container.

19. The plant container of claim 14, wherein the connection between said conical cover jacket and said trap dish is detachable.

20. The plant container of claim 14, wherein the connection between said conical cover jacket and said grid pot is detachable.

21. The plant container of claim 14, wherein air is drawn into said circumferential air slot in a chimney fashion.

\* \* \* \* \*